Patented Oct. 6, 1936

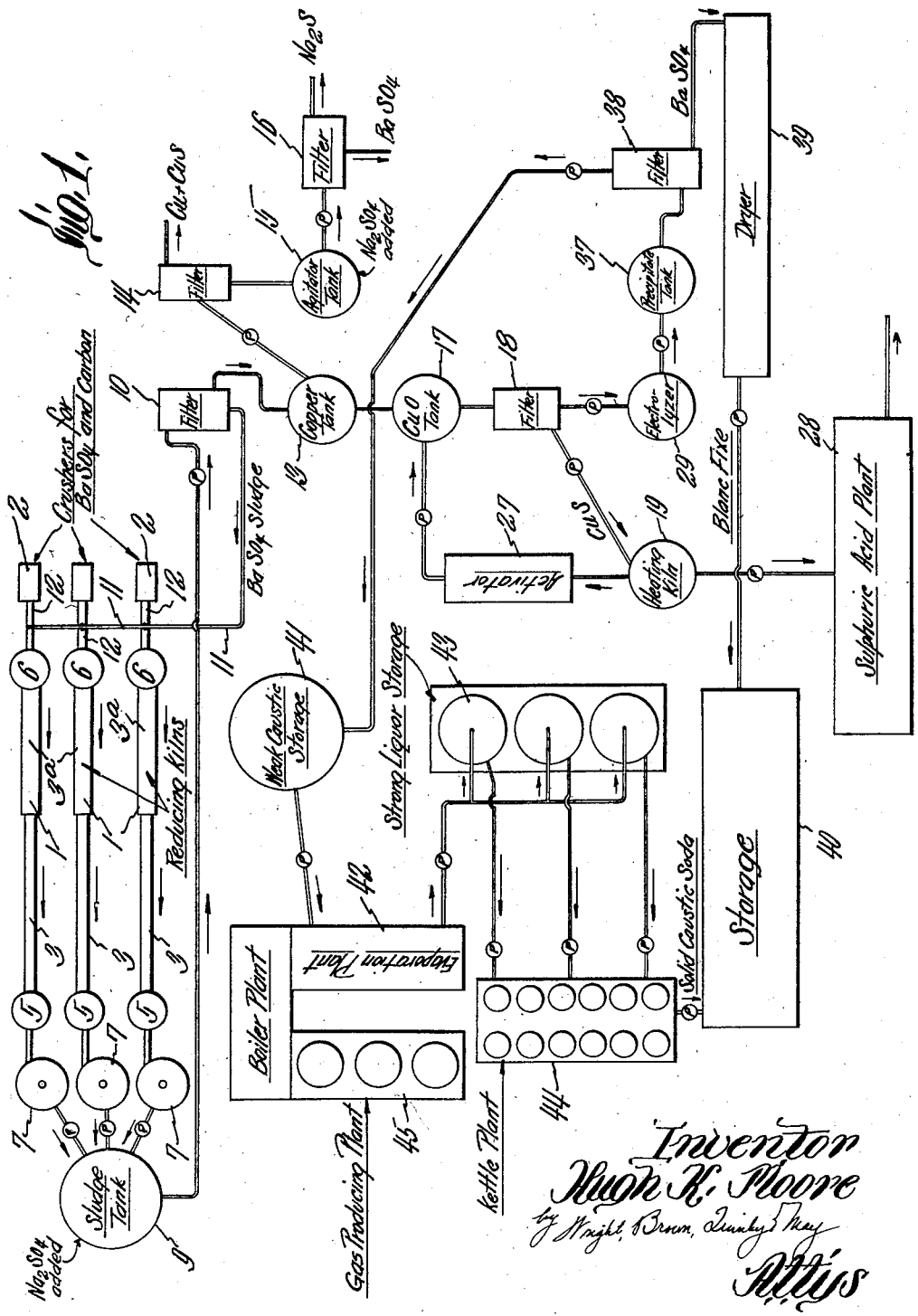

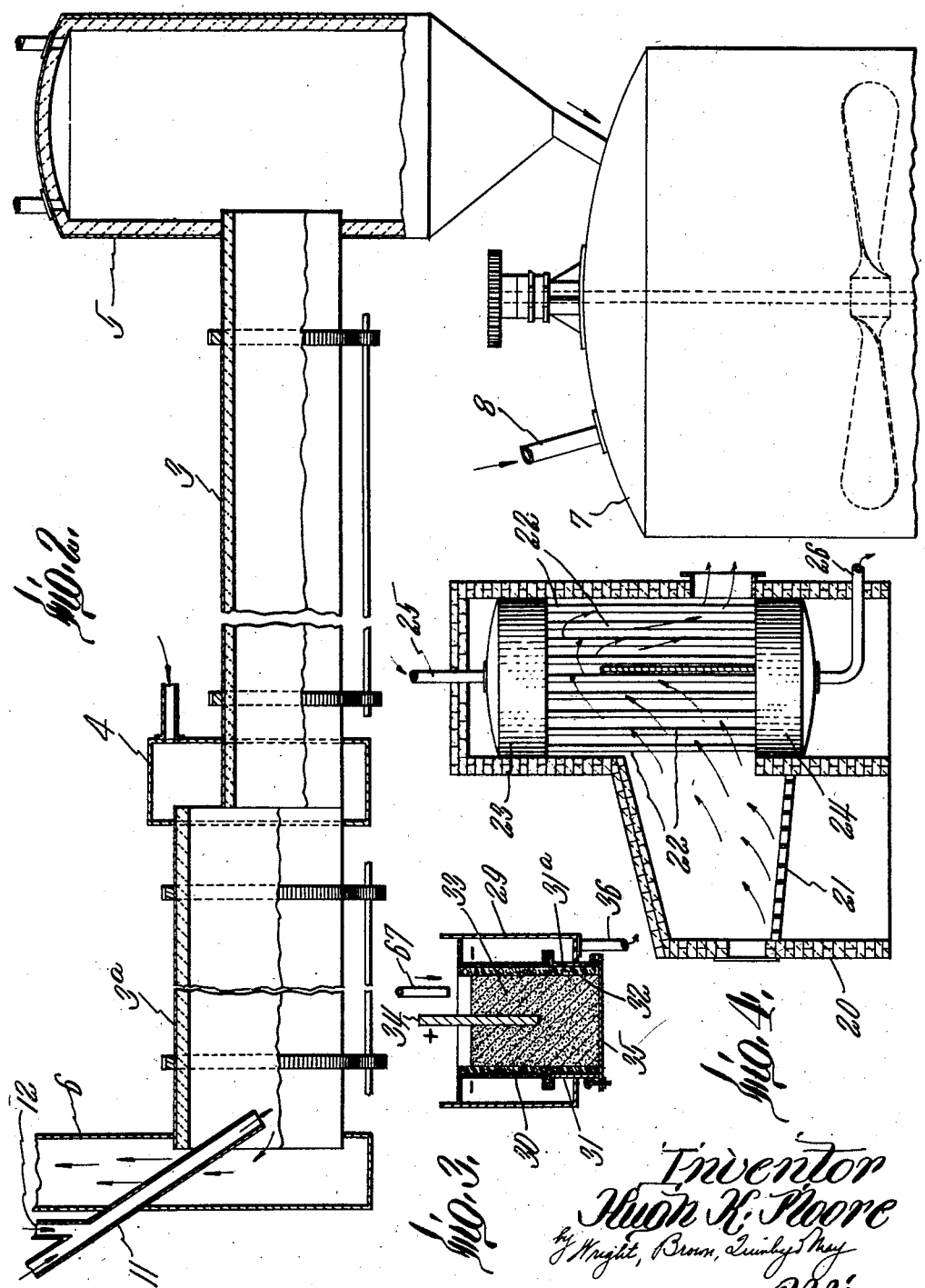

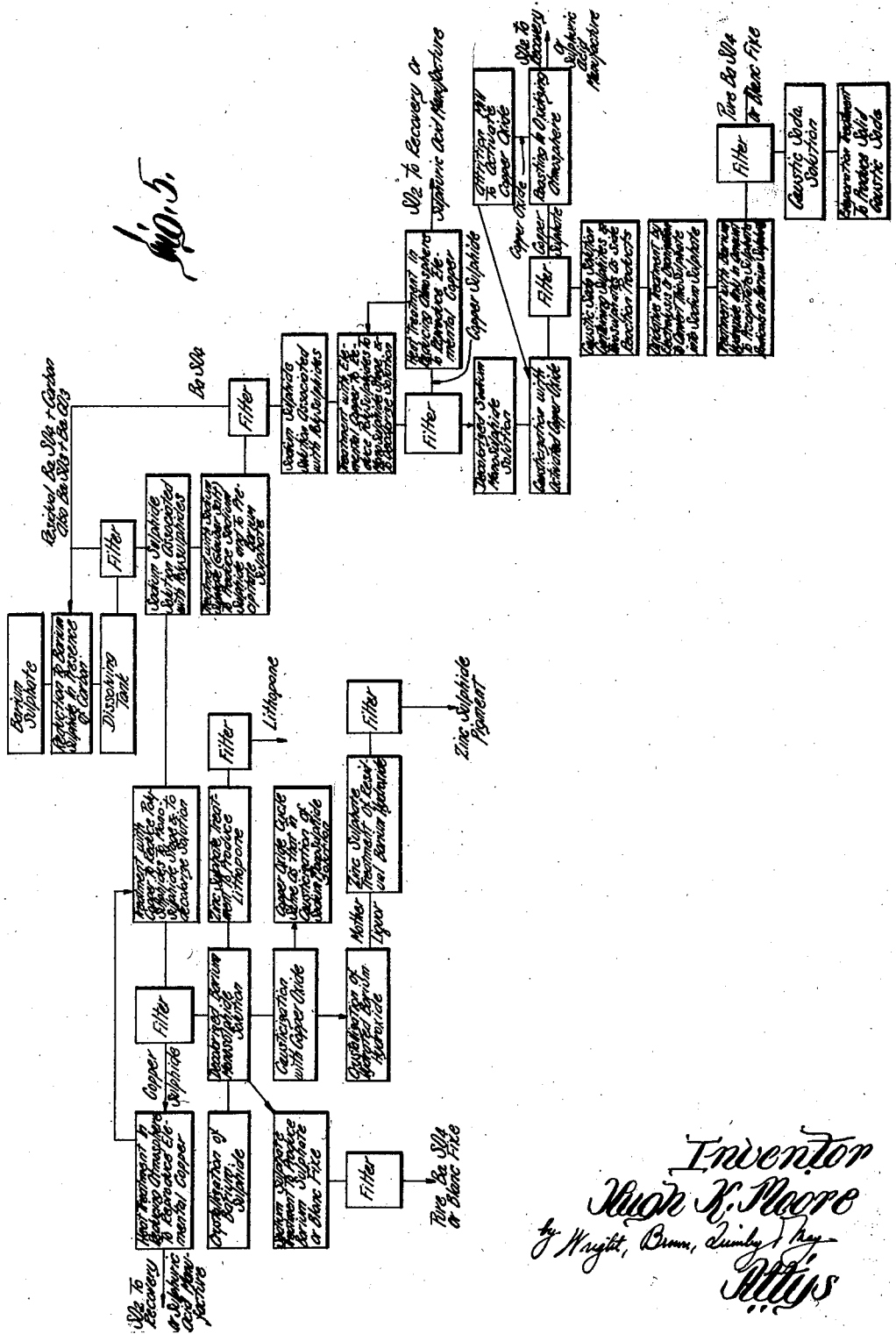

2,056,929

UNITED STATES PATENT OFFICE 2,056,929

PRODUCTION OF ALKALINE COMPOUNDS, SULPHURIC ACID, AND OTHER VALUABLE CHEMICALS

Hugh K. Moore, Berlin, N. H., assignor to Brown Company, Berlin, N. H., a corporation of Maine Application May 13, 1933, Serial No. 670,882

31 Claims. (Cl. 23—183)

The subject of this invention is the economical production of alkaline compounds, sulphuric acid, and other valuable chemicals, starting more particularly with sodium sulphate as the raw material. There are various regions, especially in Canada and in the United States, where sodium sulphate abounds in nature in the form of Glauber salt ($Na_2SO_4.10H_2O$). Many of these deposits of sodium sulphate are of a substantially pure nature, wherefore, the sodium sulphate needs little, if any, purification, aside from filtration, to be adaptable to processing in accordance with my invention. If the sodium sulphate, for instance, that originating by deposition or crystallization from lakes or other natural bodies of water, carries other salts such as sodium chloride as impurities, these may be readily removed by fractionally crystallizing out the sodium sulphate. Accordingly, when using sodium sulphate contaminated with small percentages of sodium chloride or other salts as the starting material, such sodium sulphate may be delivered into a hot body of water to produce a solution containing somewhat more water than is necessary to satisfy the crystallization of the sodium sulphate with its water of hydration or crystallization, whereupon, upon cooling of the solution, practically all of the sodium sulphate may be recovered in a pure, crystallized, water-white, condition while the sodium chloride or other salts remain dissolved in the slight excess of water constituting the mother liquor, which liquor may be discarded.

The process of the present invention is made up of a novel combination of steps, certain of which steps involve new chemical reactions. In order to appreciate to best advantage the new chemical reactions entering into my process, it is well to consider some of the reactions which were attempted prior to the adoption of the new reactions which are applicable to best advantage from both a technical and economic viewpoint.

To begin with, let us consider the possibility of reducing sodium sulphate in the presence of carbon as a reducing agent to form sodium sulphide which can then be converted into other alkaline compounds, such as caustic soda and sodium carbonate. If this reaction is attempted on a commercial scale in the usual kiln, one runs into many practical difficulties of a serious kind. Aside from the fact that this reaction is accompanied by many side reactions, one runs into the trouble incident to the infusibility of the sodium sulphide and its tendency to sublime without actually melting. In other words, the sodium sulphide produced as the main reaction product cannot be made to flow from the kiln on account of its infusibility. On the contrary, it is generated in the form of a more or less pasty reaction product which tends to stick to the walls of the kiln and thus to impede its discharge from the kiln to a most objectionable degree. For all practical purposes, no discharge of sodium sulphide can be had from the kiln unless one resorts to impractical and expensive batch operation or to the use of poking devices which, at best, are makeshifts. If, on the other hand, the reaction is carried out at temperatures below those giving rise to a pasty condition in the sodium sulphide, one finds that very little sodium sulphide is formed and that such sodium sulphide as may be formed is merely fluxed by the sodium sulphate to produce an efflux of substantially unconverted molten sodium sulphate from the kiln.

Having determined the practical and economic drawbacks of reducing the sodium sulphate to sodium sulphide, I set to work to determine those operating conditions that are met with in reducing alkaline earth metal sulphates, and more particularly barium sulphate, to their sulphides. In such case, I was gratified to find that under the temperature conditions conducive to the desired reduction of barium sulphate to barium sulphide, the barium sulphide existed in a solid, non-pasty condition. The temperatures employed for this purpose, although sufficiently high to promote a reduction of the barium sulphate to barium sulphide where the barium sulphate and the carbon or other reducing material exist in contact with each other, are nevertheless short of the temperature productive of a fusion of the barium sulphate and barium sulphide or of a transformation of either of these chemicals to a pasty or sticky state. This desired transformation of barium sulphate may, if desired, be effected together with a subordinate amount of sodium sulphate, as the subordinate amount of sodium sulphide thereby produced is absorbed or carried by the reaction products without materially adversely affecting the desirable physical condition of the reaction products. In other words, because of the large excess of carbon used as a reducing agent and the solid, non-pasty condition of the barium sulphide under the conditions at which it is produced, it is possible to effect a partial absorption of the pasty sodium sulphide and/or its attenuation by solid material to a point such that the mass as a whole is in a sufficiently non-pasty, mobile condition to be discharged from the kiln. It will, of course, be appreciated that the extent to which the barium sulphate is reduced to the sulphide under the requisite temperature conditions depends upon the fineness of particle size of the barium sulphate and of the carbon, or, in other words, upon the aggregate surface of these materials existing in intimate contact with each other. Thus, when the aggregate surface of the barium sulphate and the carbon is large, as compared with their aggregate volume, the reaction goes to completion to a much larger extent than when their aggregate surface exposed for reaction is small, as compared with their aggregate volume. Even when the barium sulphate is ground to exceedingly fine particle size so as to promote the reduction reaction, its particles will not undergo complete reduction for the reason that only those portions of the particles lying next to the carbon particles will undergo reduction, whereas the cores of the particles will remain unaltered. It is thus seen that the extent to which the reaction goes is a function of the particle size of the reacting materials as well as of the temperatures to which they are heated and that, no matter how fine the particle size may be, a complete conversion of the barium sulphate into its sulphide cannot be realized because of the limitation as to fineness of particle size obtainable by commerical grinding equipment. It is, however, possible to effect a reduction of most of the barium sulphate into its sulphide by working with barium sulphate and carbon of sufficient fineness, for instance, of a particle size ranging from 200 to 325 mesh or even finer. Thus, with raw materials of an initial particle size of 325 or finer mesh, it is possible to reduce as much as about 70 to 80% of the barium sulphate to barium sulphide. As a result of any practical reducing reaction conducted upon the barium sulphate, there is produced a reaction product containing particles whose surface portions consist of barium sulphide and whose cores consist of unreduced barium sulphate. Inasmuch as the reaction is carried out in the presence of an excess of carbon, these particles will be associated with free or residual carbon.

Once having produced barium sulphide, it is possible by a metathetical reaction in accordance with my invention to convert sodium sulphate into sodium sulphide by reacting upon the barium sulphide in the presence of water. This can be done by leaching the reaction products resulting from the reduction of the barium sulphate with water, during which leaching operation the sodium sulphate may be added to the mixture to effect a precipitation of barium sulphate while converting the sodium sulphate into sodium sulphide. It is preferable in some cases that the water necessary for the leaching operation be supplied in the form of a solution containing the amount of sodium sulphate desired for reaction upon the barium sulphide. It is thus seen that as a result of such metathetical reaction, the starting chemical, namely, the barium sulphate, is regenerated for re-use in the process. In this connection, it is well to observe that the precipitated barium sulphate exists in a form permissive of easier than normal filtration by virtue of the fact that its precipitation occurs in the presence of larger particles of residual barium sulphate as well as residual carbon. Ordinarily, a precipitate of barium sulphate comes down in a fine, dense condition which makes filtration exceedingly difficult. When, however, precipitation occurs in the presence of larger particles of barium sulphate and carbon, much of the precipitate enters into the fissures and pores of the larger particles, becoming entrained thereby, and thus filters out much more readily for the reason that the mass as a whole assumes a more voluminous or bulky character. Again, the precipitate consists of an intimate mixture of the barium sulphate and the carbon, which affords an excellent form of raw material to be subjected to the reducing reaction along with such fresh chemicals as are necessary.

While it is possible to convert all the barium sulphide resulting from the reducing action into barium sulphate, it may be preferable in some cases to add to the leach water an insufficiency of sodium sulphate for this purpose. By this I mean that it is desirable to maintain in the leach mixture a residual amount of barium sulphide for reasons presently to appear. It is thus seen that the leach mixture will consist of barium sulphide and sodium sulphide, which are soluble, and barium sulphate, barium sulphite, barium carbonate, and carbon, which are insoluble. The insoluble chemicals, as already indicated, are reused in the process. At this point it is well to dwell upon the form in which the sodium sulphide appears in the filtrate. Not only is there present in the filtrate the monosulphide, but also a number of polysulphides, including $Na_2S_2$, $Na_2S_4$, and perhaps higher sulphides. This tendency for polysulphide existence applies also to the barium sulphide present in the filtrate. The filtrate containing these polysulphides is characterized by its distinct yellow color, as opposed to the water-whiteness of a monosulphide solution. The composition of the filtrate is of vital import and has to be considered in connection with the reaction to which it may be subsequently subjected for the formation of caustic soda.

It is known that cupric hydroxide, preferably freshly precipitated cupric hydroxide, is capable of causticizing a solution of sodium sulphide. This reaction is one which depends upon the greater insolubility of the cupric sulphide than that of the cupric hydroxide and also upon the exothermic character of the reaction. The use of cupric hydroxide as a causticizing agent is, however, out of the question from an economic standpoint owing to the expense of preparing cupric hydroxide from a suitable cupric salt and of recovering the precipitate for causticizing use. I have discovered that it is possible to utilize cupric oxide, such as results from the direct oxidation of metallic copper or copper sulphide, as the medium for causticizing the filtrate, provided that causticization takes place under special conditions. There are many factors which affect the causticizing activity of cupric oxide, including that of the temperature under which the cupric oxide was formed, the fineness of particle size of the cupric oxide, the intimacy of contact provided between the particles of cupric oxide and the solution, the expedients adopted for exposing fresh surfaces of cupric oxide for the reaction after the cupric oxide has been filmed or enveloped by cupric sulphide, the temperature at which the causticizing reaction is conducted, and the time interval allotted for the reaction. As a result of considerable investigation, I have determined that, no matter what form of cupric oxide is employed, it is possible to effect the desired causticizing action if the cupric oxide is reduced to particles of impalpable fineness, for instance, a particle size of about 325 mesh or finer, and if the causticizing reaction is promoted by constant and vigorous agitation of the cupric oxide in suspension in the solution. Indeed, the reaction may be made to go substantially to completion in the course of as short a period as two to three hours when the optimum factors of particle size, agitation, form of copper oxide, temperature, etc., are conjunctively adhered to. This sort of practice is, however, a fussy and expensive one leading to undesirable side reactions in considerable measure. For instance, when the temperature of causticization employed is sufficiently high to foster rapid reaction, say, is approximately the boiling temperature, side reactions such as yield excessive thiosulphate and other undesirable salts are ineluctable,—much more so than when the causticizing reaction is conducted at room temperature or thereabout. On the other hand, when the reaction is conducted at room temperature to avoid as much as possible side reactions yielding these undesirable salts, the time necessary for substantially complete causticization is unduly extended and may require days. Moreover, it may become necessary to use copper oxide in vast excess over that theoretically necessary to effect causticization in order to push such reaction to completion. In any case, the amount of copper oxide necessary depends upon the temperature and processing that it has undergone in its production, as these determine its reactivity. Unfortunately, too, the least expensive form of copper oxide is also the least reactive.

The problem of reacting upon the sulphide filtrate with copper oxide in a reasonable period of time while minimizing the formation of undesirable side reaction products was one which had to be solved in order to make the process of my invention most practicable. I have made the surprising discovery that it is possible to activate all forms of cupric oxide to such an extent that they can causticize sulphide solutions even in the cold virtually instantaneously and with such an evolution of heat that the reaction is promoted thereby. Accordingly, undesirable side reactions are minimized, inasmuch as the time element conducive to side reactions is cut down to a minimum. While it is desirable that the exothermic heat of the causticizing reaction contribute to the rapidity of the reaction, nevertheless, one should preferably avoid too high a final temperature such as also promotes side reactions. Because the reaction is instantaneous, however, the factor of temperature control becomes less important than otherwise, and, accordingly, it makes little difference whether the solution is permitted to attain a high final temperature through the exothermic heat of the reaction or whether temperature rise in the solution is checked by artificial cooling. Ordinarily, it is preferable to work with solutions of maximum concentration in order to minimize the steam required for subsequently concentrating the causticized solution to a salable form, e. g., to a solid form or to the form of so-called 50% caustic soda. In any case, it is desirable to work with a solution whose initial concentration and temperature is such as to preclude the generation of appreciable steam during the causticizing reaction.

The activation of the cupric oxide for the causticizing operation may be carried out by a grinding, pounding, abrading or similar action upon the cupric oxide in the presence of water, such as can be had in machines of the class of ball mills, roller mills, stamp mills, kollergangs, colloid mills, homogenizers, etc. This activation is, as already indicated, most remarkable as compared with a promotion of the causticizing reaction by mere grinding of the cupric oxide particles in a dry way. In such latter case, there is, to be sure, a progressive increase in the rate of the causticizing reaction as the particle size of the cupric oxide becomes finer, but, even when the particles are reduced in a dry state to ultimate fineness, the rate of causticizing reaction achieved thereby is merely a straight line function of the particle surface exposed for reaction and does not compare in rapidity with the reactivity of particles of similar fineness on which energy has been expended in the presence of water. In other words, a reduction of the cupric oxide in a dry state does not do away with the inactivity inherent in the cupric oxide but merely develops more reacting surface and thereby increases the rate of the reaction. On the other hand, the expenditure of mechanical energy on the cupric oxide particles in the presence of water modifies profoundly the chemical and physical attributes thereof and so eliminates any distinctions that might exist in the nature of copper oxide to be selected. In fact, all forms of cupric oxide may be transformed by my invention to what may be considered a standard and ideal form consonant with practically instantaneous reaction upon the sodium sulphide solution.

Irrespective of the conditions under which the sodium sulphide is causticized, the resulting caustic soda solution inevitably contains considerable side reaction products, such as the sulphites and thiosulphates. For instance, through the use of unactivated cupric oxide as the causticizing agent, one invariably arrives at a badly contaminated caustic soda solution, which may sometimes contain as high as 22% or even more side reaction products even when the conditions of causticization are selected so as to minimize side reactions. While it is possible to reduce to a very significant extent the side reaction products through the use of activated cupric oxide, yet, in such case, too, one cannot avoid the generation of conspicuous amounts of side reaction products such as may render the resulting caustic soda salable only at prices considerably lower than the ordinary forms of caustic soda available on the market. Moreover, the side reactions are consumptive of appreciable starting chemical and hence make for increased cost of production. If one were to attempt to rid the resulting caustic soda solution of side reaction products, the cost of so doing would be prohibitively expensive.

An important phase of the present invention resides in the causticization of a sodium sulphide solution which has been put in a condition to undergo causticization with the generation of but a slight amount of side reaction products. I have discovered that the side reaction products engendered during causticization are attributable largely to the polysulphides invariably present in the sodium sulphide filtrate obtained as hereinbefore described. I have further discovered that if the straight or normal sulphide alone is put through a causticizing treatment with cupric oxide, the side reaction products are present in such slight amount that they may be permitted to remain in the caustic soda solution without materially affecting its salability or may be economically eliminated from the solution. It is hence seen that the desideratum to be attained in the practice of my process is the desulphurization of the sulphide solution containing the polysulphides to a stage where the sulphides exist substantially only in the form of monosulphides. I have found that a sulphide solution associated with polysulphides can be desulphurized to the desired stage by admixing therewith a suitable, finely divided, elemental metal. There are various metals in elemental form that might be used for this purpose, including zinc, lead, antimony, arsenic, etc., but these metals entail the disadvantage of being amphoteric in character and thus giving rise to the formation of salts wherein they appear as an acidic grouping. While silver is the ideal metal for this purpose, it is out of the question on account of its expense, so that the preferred metal from both a technical and economic point of view becomes copper, which can reduce the polysulphides to the monosulphide form while itself being transformed to the sulphide, which, being insoluble, does not contaminate the sulphide solution. Again, copper offers the advantage of being recoverable, after transformation into the sulphide, for re-use with the copper sulphide recovered in other parts of the system. It might be mentioned at this point that the copper sulphide can be decomposed under heat in the presence of oxygen to liberate sulphur dioxide and to form the cupric oxide entering into the causticizing reaction. The sulphur dioxide thus liberated, other than being diluted with nitrogen and oxygen, is in substantially pure form and is devoid of even traces of such elements as arsenic, antimony, etc., which tend to poison the platinum, vanadium, or other catalysts used when it is converted into sulphuric acid.

When the sulphide solution containing the polysulphides has suspended therein the elemental copper, preferably in finely divided state, the desulphurizing reaction goes quickly to completion and this can be observed by the change of color which the solution undergoes from a canary yellow or amber to water-whiteness. The amount of copper needed for consummating the desired desulphurization may be gauged in the mill by the operator in terms of this color change. It may, of course, be more accurately determined by analytical methods in the laboratory, which methods, however, would not ordinarily be used in plant practice because they are time-consuming and delicate, whereas the color change is a positive index by which an unskilled operator can quickly judge the completion of the desulphurizing action quite closely and accurately. Inasmuch as an excess of copper does no injury to the solution, an unskilled operator can always add such an excess of copper as to ensure the desired desulphurization. Once the sulphide solution has been substantially freed of polysulphides, it can then undergo causticization with the cupric oxide, preferably the activated form, as already disclosed. It is unnecessary to separate from the monosulphide solution either the metallic copper or the copper sulphide associated therewith. As a result of the causticization of a monosulphide solution with the activated form of cupric oxide, it is possible to reduce the side reaction products, including sulphites and thiosulphates, to as little as 1.2% or even less.

I have already adverted to the fact that an insufficiency of sodium sulphate may be added to the water employed for leaching the reaction products ensuing from the reduction of barium sulphate, and if desired, sodium sulphate, in the kiln. This means, of course, that barium sulphide as well as sodium sulphide is exposed to the various reactions which the sulphide filtrate undergoes. I wish hence to indicate that the barium polysulphides are reduced to the monosulphide simultaneously with the reduction of the sodium polysulphides. During the causticization of the mixed sodium monosulphide and barium monosulphide solution, the barium monosulphide, like the sodium monosulphide, is reduced to its hydroxide and this is also attended by the formation of copper sulphide. I might observe that the causticization of barium sulphide is accompanied by less tendency to form thiosulphates than is the causticization of sodium sulphide. Evidently, one of the reasons for the formation of thiosulphates is the tendency of such sulphites as are formed by side reaction to take on sulphur progressively from the solution and thereby become converted to thiosulphates. In the case of barium sulphite, however, which is insoluble and hence precipitated from the solution, this tendency exists only to the slightest degree, wherefore, the reduced tendency for the formation of the thiosulphate therefrom. Furthermore, the barium sulphide reacts with such sodium sulphite as may be formed through side reaction to precipitate barium sulphite, thereby minimizing the tendency for the formation of thiosulphate even from the sodium sulphite. Assuming that there is some polysulphide, say, sodium polysulphide, in the sulphide solution undergoing causticization, there may take place the following reaction:—

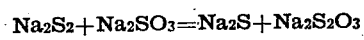

As already stressed, this reaction is most undesirable. On the other hand, even assuming that in a mixed sodium monosulphide and barium monosulphide solution undergoing causticization there is a tendency to form a slight amount of sodium sulphite as a side reaction product, as above indicated, the combination of sulphur with the sodium sulphite to form sodium thiosulphate may be minimized by virtue of the presence in the solution of barium sulphide, which tends to precipitate the insoluble barium sulphite according to the following equation:—

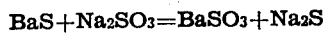

The barium sulphite thus precipitated does not tend to combine with sulphur, as does the soluble sodium sulphite.

It is thus seen that the causticizing operation yields a sludge of copper sulphide, barium sulphite, and residual copper oxide. The amount of barium sulphite present in the sludge can be kept at a minimum by applying the principles of my invention, inasmuch as such sodium sulphite as arises through side reaction in the kiln has previously been eliminated during leaching of the reaction products from the kiln with water, the sodium sulphite reacting with the barium sulphide to produce the insoluble barium sulphite which is returned to the kiln along with the precipitated barium sulphate. As already remarked, the desulphurization of the mixed sulphide solution to the monosulphide stage makes for a minimum formation of sulphites and thiosulphates as side reaction products, so that such barium sulphite as is precipitated out during the causticizing operation is exceedingly small and does not affect seriously the repeated re-use of the copper in the process. In other words, the copper sulphide subjected to the oxidizing or roasting treatment carries therewith such a small amount of barium sulphite that it may repeatedly undergo such treatment before it becomes contaminated to such an extent with the barium sulphate produced by such treatment as to give rise to the need of separating the two chemicals from each other.

The causticized solution can be filtered free of copper sulphide, copper oxide, metallic copper, and the slight amount of barium sulphite already dealt with. The filtered solids are then burned or roasted in an oxidizing atmosphere to produce the cupric oxide used in the causticizing operation and the sulphur dioxide recovered as such or converted into sulphuric acid. The filtered, causticized liquor contains essentially sodium hydroxide and barium hydroxide and but a slight amount of thiosulphate. The barium constituent may be readily removed from the solution by adding thereto sodium sulphate in the precise amount necessary to precipitate all the barium. If, however, an excess of sodium sulphate is accidentally used, a sufficient amount of barium hydroxide or additional solution containing barium constituent may be added to do away with this excess. It is thus seen that this step of eliminating barium hydroxide is attended by a conversion of more sodium sulphate into caustic soda. The barium sulphate precipitated from the solution at this stage of the process is characterized by its fineness of particle size and its extreme whiteness and purity. Barium sulphate thus made can be sold as blanc fixe for use as a filler or loading material in the paper, rubber, and paint industries. In paints, its whiteness is such that it can be used to good advantage in lieu of white lead. The precipitated barium sulphate is filtered out of the caustic soda solution, washed, and dried for storage and sale. It will, of course, be appreciated that the amount of pure barium sulphate or blanc fixe produced by my process can be varied at will, being controllable by the amount of sodium sulphate used short of that necessary to convert the barium sulphite constituent of the kiln reaction products into sodium sulphide. In other words, the amount of barium sulphide left in the leach mixture of the kiln-reaction products after the addition of sodium sulphate thereto determines the amount of blanc fixe produced in my process. It is possible also to produce lithopone by my process, in which case, too, the amount of barium sulphide allowed to remain in the leach mixture determines the amount of lithopone producible, as is true of the blanc fixe. In producing the lithopone, a filtered solution of barium sulphide alone freed of its polysulphides, as hereinbefore described; or a filtered, mixed solution of barium sulphide and sodium sulphide, similarly freed of their polysulphides, may be treated with zinc sulphate in appropriate amount. In the first case, using a solution of barium sulphide alone, all the reaction products, i. e., the zinc sulphide and the barium sulphate, are insoluble and constitute the lithopone, whereas, in the second case, if just enough zinc sulphate is added to precipitate the barium sulphide, the remaining sodium sulphide solution must be separated and recovered by filtration from the lithopone and the latter washed. If an excess of zinc sulphate is added, the lithopone must be filtered from a solution of either sodium sulphide, sodium sulphate, or both, depending upon how much excess is used. The first case, wherein a solution of barium sulphide alone serves for making the lithopone, is the one naturally to be preferred because it dispenses with the extra steps and the accompanying expense. The salient advantage of producing blanc fixe or lithopone according to my invention resides in the remarkably high degree of whiteness possessed thereby. This quality of whiteness is attributable to the decolorization which the parent sulphide solution has undergone through the treatment with metallic copper, as hereinbefore described. It may be noted that, were the sulphide solution permitted to remain colored on account of the presence of polysulphides therein, the blanc fixe or lithopone to be derived therefrom would be of a distinctly inferior whiteness and salability. Of course, if one desires to produce sodium sulphide in crystallized condition, the hot solution produced by leaching the hot reaction products containing barium sulphide, as they come from the kiln, as hereinbefore described, may be desulphurized with elemental copper to the monosulphide stage and then cooled to room temperature to crystallize out barium sulphide therefrom. If desired, the insoluble copper sulphide and excess elemental copper may be separated from the solution before crystallization of the barium sulphide is effected, although such separation is unnecessary at this stage when the crystals are to be converted into caustic soda as will presently be described. The mother liquor, which may contain from 35 to 37 grams of barium sulphide per liter at room temperature, may now be treated with zinc sulphate to precipitate all the barium constituent present therein in the form of lithopone, thereby dispensing with the step of concentrating the mother liquor by the evaporation of its aqueous content to a point where further crystallization of barium sulphide can take place. Crystallized barium sulphide thus produced can be dissolved substantially completely in its own water of crystallization by applying heat thereto, thereby producing a hot, highly concentrated barium sulphide solution from which, when it is causticized hot with copper oxide, preferably the activated form, a highly concentrated barium hydroxide solution can be had. The resulting concentrated causticized solution can be cooled to produce a virtually solid mass of crystallized barium hydroxide associated with little, if any, free water or mother liquor. On the other hand, if sodium sulphate is added to the hot, highly concentrated barium sulphide solution, a highly concentrated solution of caustic soda is produced which requires less evaporation of its water content and, accordingly, less expense, to be reduced to a salable concentration. A difficulty with this practice, however, is that it becomes more difficult to separate the caustic soda solution sufficiently completely from the precipitated barium sulphate without diluting unduly, during the washing operations, such concentrated caustic soda solution as is entrained by the precipitated barium sulphate, the barium sulphate, of course, being washed free of caustic soda solution. The first wash waters applied to the barium sulphate, in such instance, may be pooled with the concentrated caustic soda solution, whereas the last, highly dilute, wash waters may serve as leach water for the reaction products from the kiln.

The caustic soda solution containing but a slight amount of thiosulphate or other side reaction products can be concentrated to solid form or to a 50% solution for sale, in which condition it can be put to most industrial uses. In those instances where caustic soda of extreme purity is desired or necessary, the solution may undergo a suitable purification treatment designed to eliminate the sodium thiosulphate. In such case, the caustic soda solution need not be subjected to previous treatment designed to eliminate its barium constituent. On the contrary, the preferred procedure is to eliminate first the thiosulphate and then to precipitate blanc fixe therefrom. It is possible to eliminate the thiosulphate from the caustic soda solution in various ways, including oxidation with such oxidants as ozone and electrolysis. The preferred way is by an electrolytic treatment, but rather than subjecting the caustic soda solution to the action of both positive and negative electrodes, the solution is acted upon simply by a positive electrode to which the thiosulphate radical migrates and is oxidized thereat while nascent oxygen for such oxidation is liberated thereat and as the extra sulphur in the thiosulphate radical is also liberated thereat and enters into a chemical reaction hereinafter to be described. The caustic soda solution being purified is delivered as a continuous stream through the anode and thence through an insulating diaphragm and the cathode. The sodium sulphate into which the thiosulphate is oxidized precipitates some barium sulphate from the caustic soda solution, assuming that the barium constituent has been permitted to remain therein. The major portion of the barium constituent passes through the cathode and is put through the treatment with sodium sulphate designed to form additional caustic soda and the blanc fixe, as already described.

I have now described the process as a whole, but I wish to have it understood that it may lead to the production of chemicals other than caustic soda. Thus, part or all of the solution of the kiln-reaction products containing barium sulphide or containing barium sulphide and sodium sulphide may be treated, after it has undergone filtration and the appropriate desulphurization with metallic copper, with sodium sulphate solution or with zinc sulphate solution, as hereinbefore described, to precipitate barium sulphate or lithopone, as the case may be, which can be recovered, washed, and dried into finished products. Such sodium sulphide solution as is recovered may be concentrated and sold as a concentrated solution or in crystalline form. The crystalline form may, if desired, be dehydrated to a point where part or all of its water of crystallization has been removed.

Another branch of my process may involve the production of hydrated barium hydroxide. In such case, the charge of raw materials entering the reducing kiln may be a mixture of only the sulphate of barium and carbon, the reaction products issuing from the kiln hence consisting of barium sulphide, unreduced barium sulphate, barium carbonate, barium sulphite, and residual carbon. This mixture of reaction products may be leached with hot water to promote a dissolution of the barium sulphide, whereupon, the hot solution may be filtered free of solids, including the carbon and the undissolved barium sulphate, barium carbonate, and barium sulphite, and these solids returned to the kiln. The filtrate containing essentially only barium sulphide can then be directly causticized with cupric oxide, preferably the activated form, to produce a solution from which the barium hydroxide crystallizes out selectively as $Ba(OH)_2 \cdot 8H_2O$ from its associated impurities. Such impurities as the thiosulphates, which may be formed as side reaction products during the causticizing operation, are left behind in the mother liquor, the crystallized barium hydroxide hence being recoverable from the mother liquor in a state of exceedingly high purity. If desired, the barium sulphide solution associated with its polysulphides may undergo a desulphurizing treatment with elemental copper, as hereinbefore described, to produce the water-white monosulphide preparatory to causticization. Such residual barium hydroxide as remains in the mother liquor may be converted into zinc sulphide pigment by adding zinc sulphate to such liquor in the appropriate amount, whereupon the filtrate containing no valuable chemicals may be discarded. In such case, the desulphurization of the barium sulphide solution to a colorless, monosulphide solution is desirable in order to make possible the realization of a lithopone of enhanced whiteness.

With the foregoing and other features and objects in view, my invention will now be described with reference to the accompanying drawings, wherein:—

Figure 1 depicts what may be termed a flow sheet of most of the process.

Figure 2 shows diagrammatically and conventionally a type of kiln such as may be employed in effecting a reduction of the barium sulphate admixed, if desired, with sodium sulphate.

Figure 3 represents a vertical section through a preferred type of electrolytic cell such as may be employed for ridding the causticized liquor of its slight amount of thiosulphate.

Figure 4 illustrates diagrammatically and conventionally a section through preferred equipment for preheating air to be used in burning or roasting the copper sulphide.

Figure 5 depicts as a flow sheet the process as a whole, of the present invention and its various branches hereinbefore described.

Referring to Figure 1 of the drawings, the numeral 1 indicates a series of kilns whereinto the starting chemicals may be progressively fed from crushers or grinders indicated conventionally at 2. The kilns employed are preferably of the rotary type, one of such being illustrated in Figure 2. Each kiln may be made up of two sections 3, 3a, running one above the other, but, as shown, the inner ends of the sections are fitted for rotation in a stationary collar 4 which permits of the introduction of secondary air into the discharge end of the first section 3a. The discharge end of the second section 3 is journalled for rotation in a removable combined header and hopper 5 which may be mounted on wheels or on a carriage (not shown) such as is conventional in cement-kiln design. The header 5, which may be lined with heat-refractory brickwork, serves as the receiver not only for the reaction products discharged from the kiln, but also for combustible gas or vapor, e. g., producer gas, to be used as the heating medium for the charge in the kiln. The producer gas flows through the sections 3 and 3a in countercurrent contact with the charge of materials and passes out through a stack or chimney 6 leading from the intake end of the section 3a. As already indicated, the charge of materials in the kiln is preferably heated to a temperature of about 1900 to 2000° F. by the combustion of the producer gas, which is desirable as the heating medium not only from the standpoint of economy, but for the further reason that its content of hydrogen functions to reduce the particles of barium sulphate associated, if desired, with sodium sulphate, to a greater depth than otherwise. Again, producer gas is free from the contaminants associated with the hot gases ensuing from the burning of coal or similar combustible materials. The secondary air fed into the discharge end of the first kiln section 3a promotes a combustion of the carbon monoxide liberated during the reduction of the sulphate in the second kiln section 3, wherefore, the consumption of producer gas necessary for the reduction of the sulphate is minimized. The reduced charge made up of the various reaction products delivered from the hopper 5 enters an agitated tank 7 whereinto water, preferably containing dissolved therein the desired amount of sodium sulphate, is introduced through a pipe 8. Before describing the reaction that takes place in the tank 7, it is well to consider first the reaction that took place in the kiln. As already indicated, the materials charged into the kiln consist of barium sulphate, carbon, and, if desired, sodium sulphate, with the carbon present in excessive amount. Here are the essential reactions that take place:—

$$\underset{233}{\overset{340}{BaSO_4}}+\underset{48}{\overset{102}{4C}}=\underset{169}{\overset{116}{BaS}}+\underset{112}{4CO}$$

$$\underset{142}{\overset{328}{Na_2SO_4}}+\underset{48}{\overset{88}{4C}}=\underset{78}{\overset{116}{Na_2S}}+\underset{112}{4CO}$$

In the foregoing equations, the heats of formation of the various chemicals are noted in large calories above the chemicals and their corresponding weights are noted in kilograms therebelow. It will be observed that the reactions effected in the kiln are decidedly endothermic, the first reaction requiring a heat input of 122 large calories and the second reaction 124 large calories. I shall not deal specifically with such side reactions as ensue to form the sulphite and the carbonate, as they are of no particular importance in this connection. The reaction products emanating from the kiln are made up of a comparatively large proportion of sulphides, a small proportion of carbonate and sulphite, and considerable residual carbon and sulphate. When these mixed reaction products are mixed with the sodium sulphate solution in the tank 7, the following reaction, which is one essential to my process, takes place:—

$$\underset{169}{\overset{102}{BaS}}+\underset{142}{\overset{328}{Na_2SO_4}}=\underset{78}{\overset{88}{Na_2S}}+\underset{233}{\overset{340}{BaSO_4}}$$

The amount of sodium sulphate used at this point is preferably, as already indicated, short of that necessary to convert all the barium sulphide into the insoluble barium sulphate. The particular amount thus short may vary, depending upon the amount of pure barium sulphate or blanc fixe which it is desired to recover at a later stage of the process. The solution containing the insoluble materials suspended therein is passed to an agitated sludge tank 9 serving for storage and solution purposes, whence the suspension is passed to a filter 10 of any suitable design. As already pointed out, because of the nature of the solids associated in suspension with the solution, recovery of the precipitated barium sulphate by filtration is facilitated. The solids recovered in the form of a sludge are run back to the kilns through a return chute 11 leading through the stack or chimney 6 into the intake end of each kiln section 3a. The chute 12 shown alongside of the return chute 11 serves for the introduction of fresh raw materials. The solids returned to the kiln include not only barium sulphate, but also a subsidiary amount of barium carbonate and barium sulphite and a comparatively large amount of carbon, for, as already indicated, the reaction products of the kiln include barium carbonate and barium sulphite and, when sodium sulphate is used, also sodium carbonate and sodium sulphite. The last-named two chemicals, however, undergo reaction in the presence of water in the tank 7 according to the following equations:—

$$Na_2SO_3+BaS=BaSO_3+Na_2S$$

$$Na_2CO_3+BaS=BaCO_3+Na_2S$$

Such barium carbonate and barium sulphite as enter the kiln undergo the following reduction in the presence of carbon:—

$$BaCO_3+C=BaO+2CO$$

$$BaSO_3+3C=BaS+3CO$$

Both of the foregoing reactions are endothermic, like the reducing action effected on the barium sulphate and the sodium sulphate. It might be mentioned that such water as accompanies the sludge returned through the chute 11 into the first kiln sections 3a is evaporated by the hot gases contacting therewith in their flow through the kiln section 3a. In fact, the kiln sections 3a may be considered as drying and preheating sections, whereas the sections 3 are the ones wherein most of the reduction occurs with the liberation of the carbon monoxide which is burnt by the aid of secondary air introduced into the sections 3a.

The filtrate from the filter 10 is passed into an agitated tank 13 whereinto finely divided copper of a particle size of, say, 200 to 325 or finer mesh is added in sufficient amount to desulphurize the filtrate solution to a stage where substantially all the sulphides present therein exist as monosulphides, as attested by the change of color of the filtrate solution from a pronounced yellow to water whiteness. The desulphurizing reactions are:

1. $$\underset{110}{\overset{93}{Na_2S_2}}+\underset{63}{\overset{88}{Cu}}=\underset{78}{\overset{10}{Na_2S}}+\underset{95}{CuS.}$$

2. $$\underset{174}{\overset{98}{Na_2S_4}}+\underset{189}{\overset{88}{3Cu}}=\underset{78}{\overset{10}{Na_2S}}+\underset{285}{3CuS.}$$

3. $$BaS_2+Cu=BaS+CuS.$$

4. $$BaS_4+3Cu=BaS+3CuS.$$

The exothermic character of these reactions, demonstrating that they will tend to proceed to completion, is indicated in the first two equations by the heats of formation noted for the chemicals present in the first two equations. The last two reactions are of a similar nature, but, inasmuch as the heat contents of the barium polysulphides are unavailable, these have not been given. It will, of course, be appreciated that it is not only exothermic chemical reactions which are possible, as there are many chemical reactions which take place in solution because of the formation of precipitates or gases, which remove themselves from the sphere of reaction. On the other hand, reactions effected in the solid state afford by their thermal chemical equations a good index as to whether they will tend to take place or whether they can be made to take place in practice by the application of sufficient heat.

Assuming that it is desired to produce sodium sulphide as a product of my process, the monosulphide solution will be delivered to a filter 14, which removes therefrom the copper and copper sulphide and which discharges the filtrate into an agitated tank 15. To this tank may be added sodium sulphate in an amount precisely calculated to precipitate all the barium sulphide present in the solution in the form of barium sulphate or blanc fixe. The solution associated with the precipitate may then go to a filter 16, which delivers a substantially pure sodium sulphide solution and the blanc fixe. The sodium sulphide solution may be concentrated to the desired degree, for instance, to a solid crystalline form, and sold in this condition. The blanc fixe may be washed and dried for sale.

In the event that the process is to be practiced, at least in part, to completion for the production of caustic soda, the desulphurized solution in the desired volume is delivered from the tank 13 to an agitated causticizing tank 17. The solution delivered to the tank 17 need not be filtered, that is, may contain the copper sulphide and the residual metallic copper resulting from the reaction in the tank 13. To the solution in the causticizing tank 17 is added cupric oxide in the desired form in amount sufficient to ensure the desired conversion of the sodium sulphide into caustic soda. As hereinbefore stressed, I prefer to use an activated form of cupric oxide such as is producible by subjecting ordinary forms of cupric oxide to the action of a ball mill or equivalent instrumentality in the presence of water. It is advisable to construct the active surfaces of these instrumentalities, for instance the balls of the ball mill, as far as possible of copper in order to avoid contamination of the cupric oxide with the materials abraded from the active surfaces. The slurry of activated cupric oxide as it comes from the ball mill may be that introduced into the tank 17. Here is the causticizing reaction that takes place at this stage of the process:—

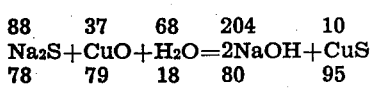

As can be seen from the heats of formation of the chemicals appearing in the foregoing equation, the causticizing reaction is an exothermic one. The fact is that with the activated form of cupric oxide, which makes for exceedingly high rate of reaction, the heat evolved is sufficient to produce a considerable temperature rise in the causticized solution. The temperature rise will, as hereinbefore indicated, depend upon the concentration of the solution being causticized. The final temperature of the causticized solution will, however, depend both upon the concentration of the solution and its initial temperature.

The causticized liquor is passed to a filter 18 for the recovery of its various copper constituents, including such metallic copper and copper sulphide as came from the tank 13 and such copper sulphide and copper oxide as result from the reaction effected in the tank 17. The recovered copper constituents are put through a burning or roasting treatment in a suitable furnace or kiln 19, for instance, one of the Wedge, Herschoff, or other suitable design. I wish to remark that the burning or roasting of the copper constituents, and more especially the copper sulphide, must be performed at exceedingly high temperature in order to go to completion at the desired rapidity. Indeed, the air used in the furnace 19 as the oxidizing medium should preferably be at temperatures in the vicinity of 1500 to 2000° F. in order to accomplish the desired reaction sufficiently speedily. I prefer to preheat the air introduced into the furnace 19, at least during the initiation of the oxidizing reaction effected therein, in a heater of the kind illustrated in Figure 4, although other air heaters, such as the brickwork columns provided for preheating the air used in the open hearth furnaces for the production of steel may be employed. As shown in Figure 4, the heater may include a suitable furnace indicated generally at 20 on whose grate 21 a fire of coal or other suitable combustible solid material may be kept going at the proper intensity. The furnace may, however, be fired with producer or other combustible gases or vapors. The hot burned gases pass from the furnace 20 into indirect contact with a nest of fused quartz tubes 22, whose ends are fitted into air-receiving chambers or headers 23 and 24. The air, which is preferably passed into the upper header or chamber 23 through the inlet pipe 25, proceeds downwardly through the tubes into the lower header or receiving chamber 24, whence it issues in suitably pre-heated condition through the outlet pipe 26 communicating with the discharge end of the roasting or burning furnace 19. The major reaction taking place in the furnace 19 is the oxidation of the copper sulphide with the liberation of sulphur dioxide according to the following equation:—

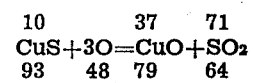

From the heats of formation of the chemicals involved in this reaction, it is plain that the reaction is a strongly exothermic one and, once initiated, will proceed in and of itself without the application of external heat. The copper oxide is shown passing from the furnace 19 to an activator 27, e. g., a ball mill, and thence to the tank 17. The sulphur dioxide is indicated as going to a sulphuric acid plant 28 for the production of sulphuric acid. I wish to point out at this time that, depending upon the conditions under which the roasting furnace is run, there may be a tendency to oxidize a comparatively small amount of the copper sulphide into copper sulphate. This means that when the copper oxide is subjected to activation in the presence of water, the water will dissolve the copper sulphate. In actual operation, it has been found that, under most circumstances, the water of the slurry coming from the activator 27 will show a blue tint, sometimes a deep blue tint, indicating the presence of copper sulphate. The presence of copper sulphate in the tank 17 is undesirable for the reason that it would tend to react with the barium sulphide to contaminate the copper with barium sulphate. Accordingly, I prefer to deliver the slurry from the activator 27 to a filter (not shown) for the separation of the copper oxide from the copper sulphate solution before the copper oxide is introduced into the tank 17. Not only does this do away with undesirable reaction in the tank 17 and the dilution of the caustic soda solution produced therein, but the solution of copper sulphate recovered from the copper oxide can be electrolyzed for the recovery of metallic copper before delivery to the sewer. The metallic copper thus recovered can be used advantageously at two stages of the process, for instance, as the copper added to the tank 13 and as the copper used as the anode for purifying the caustic soda solution.

In connection with the burning or roasting treatment which the copper constituents undergo in the furnace or kiln 19, it is apposite to observe that it is possible to produce substantially undiluted sulphur dioxide by carrying out the heat treatment in the absence of air but in the presence of added copper sulphate and/or copper oxide. This sort of practice is desirable when the sulphur dioxide is to be compressed and refrigerated to liquid form and sold for refrigeration, bleaching, and other uses. Here are the reactions consummated in such case in the furnace:

$$CuSO_4 + CuS = 2Cu + 2SO_2$$

$$CuS + 2CuO = 3Cu + SO_2$$

The molten metallic copper leaving the kiln as a reaction product can be atomized, as in a current of steam, air, or other gas, to produce finely divided copper containing some copper oxide. Such copper may be used at those stages of my process where needed and/or be roasted in the presence of air to form copper oxide to be used in the causticizing step of my process. If desired, the molten metallic copper resulting from the foregoing reactions may be cast into ingots, which may then be established as the anodes of a copper sulphate electrolyzing bath, the cathodes of which are subjected to an electric current of sufficiently high current density to effect a deposition of finely divided, or spongy, refined copper. Such finely divided copper may be used at those stages of my process where needed and/or be roasted in the presence of air to produce the copper oxide serving in the causticizing operation of my process.

The filtrate consisting of caustic soda solution coming from the filter 18 may be rid of its thiosulphate by oxidation as with ozone, but it is preferably subjected to a special electrolytic treatment, as hereinbefore described. The electrolytic cell employed for this purpose is preferably constructed as shown in Figure 3. Thus, as therein shown, the cell may include an outer tank 29 constituting the receiver for the purified caustic soda solution passing through a porous cathode 30, which, as shown may take the form of a rolled wire filter cloth of tubular shape. The bottom edge of the cathode may be secured to, but insulated from, the upper edge of a cylindrical container 31 projecting through the bottom of the tank 29. The anode material is preferably granulated copper 33, which fills the anode chamber defined by the cathode 30 and the container 31 practically to the top edge of the cathode. Insulation is afforded as customarily between the anode material 33 and the cathode 30 in the form of a porous material, such as asbestos, "Filtros", or paper 32, which keeps the anode material from electrical contact with the cathode 30 and the walls of the container 31 whose internal surface is lined with a suitable non-conductor 31a, such as cement, brick, etc., in contact with the anode material. Current is supplied to the anode material by way of a copper electrode 34, whose lower end portion is surrounded over a considerable depth by the anode material. A stream of the caustic soda solution to be purified enters the anode chamber from a pipe 67, percolates through the anode material, and passes out through the porous insulating medium 32 and the perforations of the cathode 30 into the receiving tank 29. The solution thus comes into contact with a large aggregate surface of anode material and the slight amount of thiosulphate present therein is decomposed and removed therefrom before it gets into the receiving tank 29. The anode material may in time become contaminated with the reaction products of electrolysis presently to be noted, wherefore, the bottom 35 of the container 31 is preferably removably secured to permit of quick dumping of the charge of anode material when excessive contamination makes this necessary. The reactions taking place in the anode chamber are:—

$$\underset{259}{Na_2S_2O_3} + \underset{204}{2NaOH} + \underset{656}{4O} = \underset{68}{2Na_2SO_4} + H_2O$$

$$Na_2SO_4 + Ba(OH)_2 = BaSO_4 + 2NaOH$$

$$\underset{259}{Na_2S_2O_3} + \underset{328}{2Cu} + \underset{20}{O} = Na_2SO_4 + Cu_2S$$

The first and third of these equations, which are written with the heats of formation of the chemicals appearing therein, are strongly exothermic, whereas the second reaction is an ionic one and hence tends to proceed to completion on this account. The point to be emphasized, however, is that the reactions in the electrolytic cell are such as conduce strongly to the elimination of the thiosulphate appearing as an impurity in the caustic soda solution, without the consumption of an undue amount of electric current, by the nascent oxygen developed at the anode material. It is, of course, obvious that when barium is absent from the caustic soda solution, the second reaction will not take place. If such is the case, barium hydroxide may be added to causticize the sodium sulphate and thus to precipitate barium sulphate, which can be removed as by settling or filtration. The sodium sulphate impurity may also be removed by crystallizing it out in the course of the subsequent evaporative treatment designed to concentrate the caustic soda to a salable condition. These remarks hold true also when the thiosulphates present in the caustic soda solution are oxidized with ozone to the sulphate and there is no barium constituent present in the solution to causticize the sulphate. On the other hand, when the caustic soda solution contains some barium hydroxide and when it is preferable to recover the barium hydroxide as such, rather than to convert it into blanc fixe, this can be done by crystallizing out the barium hydroxide, as by cooling the solution or as by depending upon the subsequent evaporative treatment to which the caustic soda solution is subjected. It is perhaps pertinent to observe at this point that all the solutions undergoing the processing of the present invention are preferably maintained hot from the beginning to the very end, for instance, from the leach solution of the kiln-reaction products to the finished salable caustic soda. The heat content of the leach solution is, of course, furnished by the highly heated reaction products of the kiln and/or by such heat as is supplied thereto, if desired, as in the form of steam. The causticized solution, moreover, acquires heat from the causticizing reaction which, as already stressed, is strongly exothermic and makes for a sudden rise in temperature when it is performed with activated copper oxide. Barium hydroxide produced at this stage of the process may be used as such or put to use in those stages of the process where sodium sulphate has been used in excessive amount. For instance, such barium hydroxide may be added to do away with such excess of sodium sulphate as is added to the leach water for the reaction products coming from the kiln. Indeed, the barium hydroxide may in such case be added in sufficient amount not only to react upon all of the sodium sulphate but to provide barium constituent in the leach solution. So, too, such practice may be adopted when too much sodium sulphate has been added in making blanc fixe at a later stage of the process, as hereinbefore described. Further, the barium hydroxide may be used similarly in doing away with such sodium sulphate as results from thiosulphates during the electrolysis or ozonization of the caustic soda solution.

It will be observed that the anode material tends to become contaminated by copper sulphide and barium sulphate, this being the reason for the provision made, as hereinbefore described, for the renewal of anode material. In those instances when the thiosulphate is present in negligible amount or when the caustic soda solution is to be put to uses wherein a slight amount of thiosulphate is unobjectionable, the purifying step of my process may be omitted. The purified caustic soda solution continuously being delivered from the bottom of the receiving tank 29 through the outlet pipe 36 is delivered to an agitated tank 37 wherein such barium constituent as may be present therein is precipitated in the form of barium sulphate or blanc fixe through the addition of sodium sulphate. It will be appreciated that this step, too, is avoided when barium and thiosulphates are absent from the caustic soda solution. The precipitated barium sulphate present in the purified caustic soda solution delivered from the tank 37 is permitted to settle out as a slurry, which is first separated as by decantation from the clear supernatant liquor and then separated from its associated liquor by a filter 38. The filtrate, together with the decanted caustic soda solution, is then put through the usual after-treatments for the production of concentrated or commercial caustic soda. The filtered solids may be washed and passed through a drier 39 from which emerges the blanc fixe which is shown as being sent to a storage space 46.

The weak caustic soda solution is shown as proceeding to a caustic soda storage tank 41, from which it may be delivered to an evaporating system indicated conventionally at 42 and thence to strong liquor storage tanks 43. The strong liquor in the tanks 43 may be the so-called liquid caustic soda of commerce made up of about equal proportions of caustic soda and water. Should it be desired to produce the so-called solid caustic soda of commerce, the strong liquor from the tanks 43 may be subjected to further dewatering in heating kettles 44 until the fused caustic soda is substantially anhydrous and solidifies to a solid mass when put into drums for storage and sale. The solid caustic soda thus produced is shown going to the storage space 40.

The heat necessary for the practice of the various steps of my process may be generated from any suitable fuel, including coal, oil, natural gas, etc., but, as already indicated, I prefer to use producer gas more particularly for effecting the reducing reaction in the kilns. Accordingly, a gas-producer plant is indicated conventionally at 45. The producer gas thereby produced may serve not only for the purpose of heating the kilns but also for the purpose of generating the steam used for the caustic soda evaporators and also that used for heating the kettles 44. It may also be used to advantage for combustion in the furnace 20 operated for the purpose of pre-heating the air serving to initiate the burning or roasting reaction performed upon the copper constituents in the kiln 19.

There are various departures that might be made from the process as hereinbefore described without, however, departing from the principles and spirit of my invention. As already indicated, I prefer to use a substantially pure form of carbon, such as so-called oil coke, tar coke, charcoal, etc., as the chemical employed for effecting the reducing reaction in the kilns. Aside from the fact that these forms of carbon are available commercially in tremendous quantities, they are associated with but little extraneous matter, oil coke, for example, being seldom higher than 0.1% in its content of inorganic matter such as leaves upon complete combustion an ash or residue. If, however, these forms of carbon are unavailable at the particular locality where my process is being practiced, or, if their shipping costs to such locality are excessive, one may advantageously resort to the use of such forms of carbon as coal, coke, or the like. In such latter case, however, one must make provision for the disposal of the ash contents of these fuels, to which end, the reducing reaction might well be carried out progressively in a succession of stages or kilns, the reaction products from one kiln being leached with water and the solid residue removed from the resulting solution being passed to a succeeding kiln, which operations are repeated until substantially all the barium sulphate which entered the first kiln has been consumed by the reaction to form the sulphide. The leach waters of the various kilns may be pooled and subjected to the subsequent treatments of my process, including treatment with sodium sulphate to precipitate barium sulphate and to form sodium sulphide. The barium sulphate thus reproduced is returned to the first stage or kiln of the reaction. The ash or insoluble matter resulting from the successive leaching operations is, of course, finally discharged ensemble from the last kiln and discarded. When practicing this sort of procedure, the pooled leach waters will contain in solution substantially only barium sulphide and such sodium sulphide as may be formed from the sodium sulphate admixed with the barium sulphate as raw material.

In some localities, it may be advantageous to resort to the use of gaseous reducing agents rather than solid ones like petroleum coke, coal, charcoal, sawdust, refuse wood, etc. In such case, one may well carry out the reduction of the barium sulphate in the kilns by using such gaseous reducing agents as producer gas alone, oil gas, natural gas, and other inexpensive forms of gaseous reducing media. In such case, the gaseous reducing media are not burned in the kiln, since otherwise the desired reducing atmosphere could not be maintained in the kiln. Such external heat as is necessary for heating the barium sulphate and the reducing gases to effect the desired reaction therebetween may be supplied from an electrical or other suitable source. The gaseous products of the reaction, being of high combustibility and fuel value, may serve for the generation of steam and power, in which case, one enjoys a distinct advantage over such solid reducing agents as coal, coke, peat, etc., in that there is no ash disposal problem. It is further possible and, in some localities, perhaps advantageous to use such solid reducing agents of the nature of gilsonite or similar hydrocarbonaceous materials, which function as reducing agents, as well as such liquid hydrocarbonaceous materials as coal tar, pitch, and materials of similar nature, which, under the action of heat, tend to "coke up" and liberate carbon and combustible reducing gases.

The present invention may be extended to the use of alkaline earth metal sulphates, other than barium sulphate, as raw material, when such sulphates function equivalently to barium sulphate. This is true notably of strontium sulphate. So far as barium compounds and strontium compounds function equivalently in my process, I intend that the term "barium" used in the appended claims be considered under the doctrine of chemical equivalency to include strontium, especially since strontium compounds find application in the pyrotechnic, sugar, and other industries. Inasmuch as I do not known of any deposits of alkali metal sulphates of any significance, other than sodium sulphate, I have described my invention in terms of its advantages as applied to sodium sulphate. Nevertheless, there is the bare possibility that large deposits of potassium sulphate and other alkali metal sulphates may be discovered. Inasmuch as all the alkali metal sulphates lend themselves to processing in accordance with my invention, I wish to make it plain that I intend to have the doctrine of chemical equivalency apply to my claims even though they may be couched in terms of the processing of sodium sulphate or the sodium compounds produced in such processing.

While the foregoing description mentions essentially only copper or copper compounds as the reactants in various steps of my process, it is to be understood that other metals or metal compounds which behave in the same general way as copper or copper compounds are comprehended by my invention. For instance, lead may be used in the same way as copper, but, in such case, any plumbites or plumbates ensuing as side reaction products should be removed from the finished caustic soda solution by electrolysis. If zinc is used, zincates should be similarly removed. The same holds true of other amphoteric metals applicable in my process. The successful causticization which I perform on sulphide solutions through the use of heavy metal oxides as the causticizing media, as disclosed herein, hinges on the fact that the sulphides of these metals are not only insoluble but that they do not hydrolyze in the presence of water to yield an appreciable amount of water-soluble products, as distinguished from such oxides as that of calcium oxide, whose sulphide, despite its insolubility, hydrolyzes in water to yield the soluble calcium hydrosulphide.

I have assumed for convenience and clarity of description that solutions of the sulphides contain the sulphides as such. Such, however, is not really the case. Indeed, solutions of sodium sulphide and barium sulphide are ones wherein these sulphides hydrolyze as follows:—

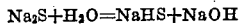

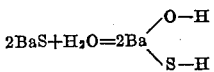

Despite the foregoing hydrolyses, the reactions hereinbefore outlined take place as I have indicated them, so that for all practical purposes the factor of hydrolysis may be disregarded. In this connection, it might further be mentioned that if the causticizing reaction to which the sulphides are subjected were written in terms of the products of hydrolysis, the products of the causticizing reaction are no different than when the hydrolysis is disregarded. This is apparent from the following comparison made between a causticizing reaction written in terms of the products of hydrolysis of sodium sulphide and one written in terms of the sodium sulphide itself.

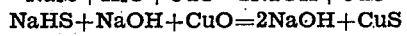

It is seen that, inasmuch as the foregoing equations are really the same excepting that they are written in different ways, the exothermic heats of reaction must necessarily be the same in both cases. These reactions written with the heats of formation of the chemicals entering thereinto are:

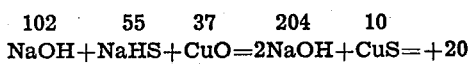

The slight discrepancy between these two equations in terms of liberated heat is not a real one but one incident to the variations of heats of formation given by different observers. Indeed, in presenting herethroughout heats of formation of chemicals entering into chemical reaction, I have purposely given the heats of formation in whole numbers for the reason that various observers differ as much as two to three calories in their observations of the heats of formation possessed by chemicals. These variations, being far greater than values to the right of a decimal point, may hence be disregarded, as there is no telling as to which observer was the most accurate one in any particular case.

For the sake of simplicity of description and clarity in the drawings, the various instrumentalities shown in the drawings are not necessarily drawn to plant scale or arranged according to preferred plant practice. Indeed, in many instances, as where a continuous operation gives way to batch operation, only one tank and one filter have been shown, whereas a plurality of tanks and filters are actually necessary. Such details as multiple air heaters and multiple copper-roasting kilns, the recovery of copper by electrolysis, the generation of direct current for the electrolytic cells, the power plant for furnishing mechanical energy to moving parts, etc., are not illustrated, but these are, of course, the subject-matter of design well within the scope of the skilled engineer who is constructing a plant; and, inasmuch as they do not constitute part of the present invention and their inclusion would further complicate an already complicated flow sheet, they have been deliberately omitted.

I claim:

1. Steps which comprise subjecting subdivided copper oxide to attrition in the presence of water to activate it for causticizing reaction, and substantially completely causticizing a solution of a sulphide with such activated copper oxide.

2. Steps which comprise roasting copper sulphide in the presence of air to produce copper oxide, activating said copper oxide by attrition in the presence of water for causticizing reaction, and causticizing a sulphide solution with said activated copper oxide.

3. Steps which comprise roasting copper sulphide in the presence of air to produce copper oxide, activating said copper oxide by attrition in the presence of water for causticizing reaction, and causticizing a sodium sulphide solution with said activated copper oxide.

4. Steps which comprise roasting copper sulphide in the presence of air to produce copper oxide, activating said copper oxide by attrition in the presence of water for causticizing reaction, and causticizing a barium sulphide solution with said activated copper oxide.

5. Steps which comprise desulphurizing a sulphide solution associated with polysulphides to the monosulphide stage by reaction of the solution with heavy elemental metal, and then causticizing the resulting monosulphide solution with a finely divided heavy metal oxide whose sulphide is insoluble and does not hydrolyze in the presence of water.

6. Steps which comprise desulphurizing a sulphide solution associated with polysulphides to the monosulphide stage by reaction of the solution with heavy elemental metal, and then causticizing the resulting monosulphide solution with finely divided copper oxide which has been activated for causticization by attrition in the presence of water.

7. Steps which comprise desulphurizing a sulphide solution associated with polysulphide to the monosulphide stage by reaction of the solution with heavy elemental metal, and then causticizing the resulting monosulphide solution with the finely divided oxide of said metal.

8. Steps which comprise desulphurizing a sulphide solution associated with polysulphides to the monosulphide stage by reaction of the solution with elemental copper, and then causticizing the resulting monosulphide solution with finely divided copper oxide.

9. Steps which comprise desulphurizing a sulphide solution associated with polysulphides to the monosulphide stage by reaction of the solution with elemental copper, and then causticizing the resulting monosulphide solution with finely divided copper oxide which has been activated for causticization by attrition in the presence of water.

10. Steps which comprise desulphurizing a sulphide solution associated with polysulphides to the monosulphide stage by reaction of the solution with heavy elemental metal, causticizing the resulting monosulphide solution with the finely divided oxide of said metal, and oxidizing such small amount of thiosulphate as is generated in the solution by side reaction attending such causticization into sulphate.

11. Steps which comprise desulphurizing a sulphide solution associated with polysulphides to the monosulphide stage by reaction of the solution with heavy elemental metal, causticizing the resulting monosulphide solution with the finely divided oxide of said metal, and electrolyzing the causticized solution to oxidize such small amount of thiosulphate as is generated in the solution by side reaction attending causticization into sulphate.

12. Steps which comprise desulphurizing a sulphide solution associated with polysulphides to the monosulphide stage by reaction of the solution with heavy elemental metal, causticizing the resulting monosulphide solution with the finely divided oxide of said metal, and ozonizing the causticized solution to oxidize such small amount of thiosulphate as is generated in the solution by side reaction attending causticization into sulphate.

13. A cyclic process which comprises subjecting subdivided copper oxide to attrition in the presence of water to activate it for chemical reaction, causticizing a solution of sulphide with said activated copper oxide, thereby producing copper sulphide, roasting said copper sulphide in the presence of air to reproduce said copper oxide but in comparatively inactive condition, and repeating the first stage of said cycle for activating said reproduced copper oxide.

14. Steps which comprise decolorizing a barium sulphide solution associated with polysulphides by reaction of the solution with heavy elemental metal, causticizing the decolorized solution with the finely divided oxide of a heavy metal, and crystallizing out the barium hydroxide.

15. Steps which comprise decolorizing a barium sulphide solution associated with polysulphides by reaction of the solution with heavy elemental metal, causticizing the decolorized solution with the finely divided oxide of said heavy metal, and crystallizing out the barium hydroxide.

16. Steps which comprise decolorizing a barium sulphide solution associated with polysulphides by reaction of the solution with copper, causticizing the decolorized solution with finely divided copper oxide, and crystallizing out the barium hydroxide.

17. Steps which comprise decolorizing a barium sulphide solution associated with polysulphides by reaction of the solution with copper, causticizing the decolorized solution with finely divided copper oxide which has been activated for causticization by attrition in the presence of water, and crystallizing out the barium hydroxide.

18. Steps which comprise decolorizing a barium sulphide solution associated with polysulphides by reaction of the solution with heavy elemental metal, crystallizing out barium sulphide from said decolorized solution, heating said crystals to dissolve them substantially only in their own water of crystallization, and causticizing said hot solution to produce a hot, concentrated barium hydroxide solution capable of solidifying upon cooling to a solid mass of barium hydroxide crystals substantially devoid of mother liquor.

19. Steps which comprise decolorizing a barium sulphide solution associated with polysulphides by reaction of the solution with heavy elemental metal, crystallizing out barium sulphide from said decolorized solution, heating said crystals to dissolve them substantially only in their own water of crystallization, and causticizing said hot solution with heavy metal oxide to produce a hot, concentrated barium hydroxide solution capable of solidifying upon cooling to a solid mass of barium hydroxide crystals substantially devoid of mother liquor.

20. Steps which comprise decolorizing a barium sulphide solution associated with polysulphides by reaction of the solution with heavy elemental metal, crystallizing out barium sulphide from said decolorized solution, heating said crystals to dissolve them substantially only in their own water of crystallization, and causticizing said hot solution with copper oxide to produce a hot, concentrated barium hydroxide solution capable of solidifying upon cooling to a solid mass of barium hydroxide crystals substantially devoid of mother liquor.

21. Steps which comprise decolorizing a barium sulphide solution associated with polysulphides by reaction of the solution with heavy elemental metal, crystallizing out barium sulphide from said decolorized solution, heating said crystals to dissolve them substantially only in their own water of crystallization, causticizing said hot solution to produce a hot, concentrated barium hydroxide solution, and adding sodium sulphate to such solution to form a concentrated caustic soda solution and to precipitate barium sulphate.

22. A process which comprises decolorizing a sulphide solution associated with polysulphides by reaction of the solution with elemental copper, causticizing the decolorized solution with copper oxide, thereby forming copper sulphide, and heating said copper sulphide in a reducing atmosphere to reproduce elemental copper for the repetition of the first-named step.

23. A process which comprises decolorizing a sulphide solution associated with polysulphides by reaction of the solution with elemental copper, causticizing the decolorized solution with copper oxide, thereby forming copper sulphide, and heating said copper sulphide in the presence of another copper compound but in the substantial absence of gas other than sulphur dioxide to reproduce metallic copper for the repetition of said first-named step and to product substantially undiluted sulphur dioxide.

24. A process which comprises reducing barium sulphate under heat and in the presence of carbon to produce barium sulphide, leaching out with water the soluble reaction products, including the barium sulphide, treating the solution with sodium sulphate to precipitate barium sulphate and to form sodium sulphide, desulphurizing the resulting sodium sulphide solution with metallic copper to the monosulphide stage, and causticizing the monosulphide solution with copper oxide.

25. A process which comprises reducing barium sulphate under heat and in the presence of carbon to produce barium sulphide, leaching out with water the soluble reaction products, including the barium sulphide, treating the solution with sodium sulphate to precipitate barium sulphate and to form sodium sulphide, desulphurizing the resulting sodium sulphide solution with the metallic copper to the monosulphide stage, causticizing the monosulphide solution with copper oxide, and separating such copper and copper sulphide as settles out from the causticized solution.

26. A process which comprises reducing barium sulphate under heat and in the presence of carbon to produce barium sulphide, leaching out with water the soluble reaction products, including the barium sulphide, treating the solution with sodium sulphate to precipitate barium sulphate and to form sodium sulphide, desulphurizing the resulting sodium sulphide solution with metallic copper to the monosulphide stage, causticizing the monosulphide solution with copper oxide, separating such copper and copper sulphide as settles out from the causticized solution, and oxidizing such thiosulphate as is present in the causticized solution into sulphate.

27. A process which comprises reducing barium sulphate under heat and in the presence of carbon to produce barium sulphide, leaching out with water the soluble reaction products, including the barium sulphide, treating the solution with sodium sulphate in amount short of precipitating all the barium constituent as barium sulphate, desulphurizing the resulting sodium sulphide solution with elemental copper to the monosulphide stage, causticizing the monosulphide solution with copper oxide, adding sodium sulphate to the causticized solution to precipitate in the form of barium sulphate such barium constituent as is present therein, and separating the precipitate from the caustic soda solution.

28. A process which comprises reducing barium sulphate under heat and in the presence of carbon to produce barium sulphide, leaching out with water the soluble reaction products, including the barium sulphide, treating the solution with sodium sulphate in amount short of precipitating all the barium constituent as barium sulphate, desulphurizing the resulting sodium sulphide solution with elemental copper to the monosulphide stage, causticizing the monosulphide solution with copper oxide, oxidizing such thiosulphate as is present in the causticized solution into sulphate, whereby part of said residual barium constituent reacts with said last-mentioned sulphate and is precipitated as barium sulphate adding sodium sulphate to the resulting solution to precipitate in the form of barium sulphate such barium constituent as is present therein, and separating the precipitate from the caustic soda solution.

29. A process which comprises progressively reducing sulphates, including barium sulphate, under heat in the presence of oil coke to produce a mobile, non-pasty mass of reaction products, leaching the mass with a sodium sulphate solution to precipitate barium sulphate and to form sodium sulphide, returning said precipitate together with the unconsumed barium sulphate and coke to the sphere of the reducing reaction, desulphurizing said solution of sodium sulphide to the monosulphide stage through the action of elemental copper, causticizing said monosulphide solution with copper oxide, oxidizing such thiosulphates as are present in the causticized solution to sulphates, and causticizing said last-mentioned sulphates with barium hydroxide to precipitate barium sulphate.

30. A process which comprises progressively reducing sulphates, including barium sulphate, under heat in the presence of oil coke to produce a mobile, non-pasty mass of reaction products, leaching the mass with a sodium sulphate solution to precipitate barium sulphate and to form sodium sulphide, returning said precipitate together with the unconsumed barium sulphate and coke to the sphere of the reducing reaction, desulphurizing said solution of sodium sulphide to the monosulphide stage through the action of elemental copper, causticizing said monosulphide solution with copper oxide, oxidizing such thiosulphates as are present in the causticized solution to sulphates, causticizing said last-mentioned sulphates with barium hydroxide to precipitate barium sulphate, and regenerating the copper constituents resulting from said desulphurizing and causticizing operations in forms suitable for the repetition of both these operations by heating the copper sulphide resulting from the desulphurizing operation in a reducing atmosphere to reproduce elemental copper and by roasting the copper sulphide resulting from the causticizing operation in an oxidizing atmosphere to reproduce copper oxide.

31. A process which comprises progressively reducing sulphates, including barium sulphate, under heat in the presence of oil coke to produce a mobile, non-pasty mass of reaction products, leaching the mass with a sodium sulphate solution to precipitate barium sulphate and to form sodium sulphide, returning said precipitate together with the unconsumed barium sulphate and coke to the sphere of the reducing reaction, desulphurizing said solution of sodium sulphide to the monosulphide stage through the action of elemental copper, causticizing said monosulphide solution with copper oxide, oxidizing such thiosulphates as are present in the causticized solution to sulphates, causticizing said last-mentioned sulphates with barium hydroxide to precipitate barium sulphate, and heat-treating a portion of the copper constituents resulting from said desulphurizing and causticizing operations in the presence of air to reproduce copper oxide for the repetition of the causticizing operation and another portion in the substantial absence of air but in the presence of added copper compounds to reproduce elemental copper for the repetition of said desulphurizing operation and to produce substantially undiluted sulphur dioxide.

HUGH K. MOORE.